J. L. WOODBRIDGE.
SYSTEM OF ELECTRICAL DISTRIBUTION.
APPLICATION FILED MAR. 20, 1908.

984,459.

Patented Feb. 14, 1911.

WITNESSES:

INVENTOR.
Joseph Lester Woodbridge
BY
Augustus B. Houghton
ATTORNEY.

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

984,459. Specification of Letters Patent. Patented Feb. 14, 1911.

Application filed March 20, 1908. Serial No. 422,352.

*To all whom it may concern:*

Be it known that I, JOSEPH L. WOODBRIDGE, a citizen of the United States, and a resident of Philadelphia, in the county of Philadelphia and State of Pennsylvania, have invented a certain new and useful System of Electrical Distribution, of which the following is a specification.

My invention relates to systems of electrical distribution in which synchronous rotating apparatus is connected to an alternating current circuit.

The object of my invention is to provide means for suppressing or reducing the effects of harmonics in the wave of alternating electro-motive-force developed by the synchronous apparatus.

It is particularly applicable to apparatus in which, to produce certain results, the field distribution is such as would tend to produce abnormal distortion of the wave shape from the true sine curve, as might occur under some circumstances in rotary converters designed as described in Letters Patent Nos. 679,812 and 679,813, issued to me under date of August 6th, 1901, and in Letters Patent No. 873,714, issued to J. L. Burnham, under date of December 17th, 1907.

The general nature and scope of my invention will be more clearly understood by reference to the following description in connection with the accompanying drawings, in which—

Figure 1:
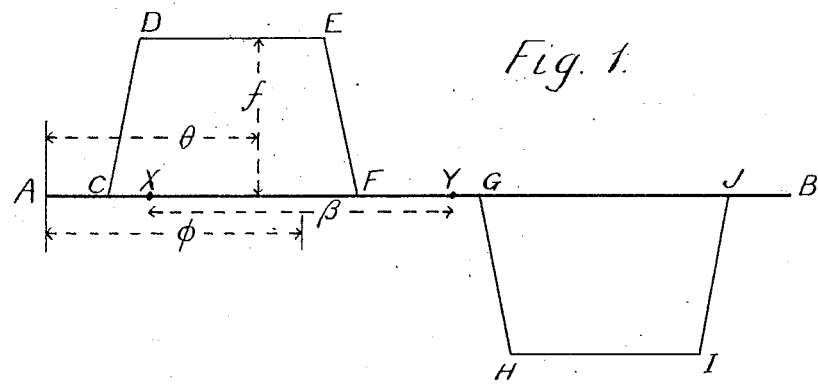
Figure 2:
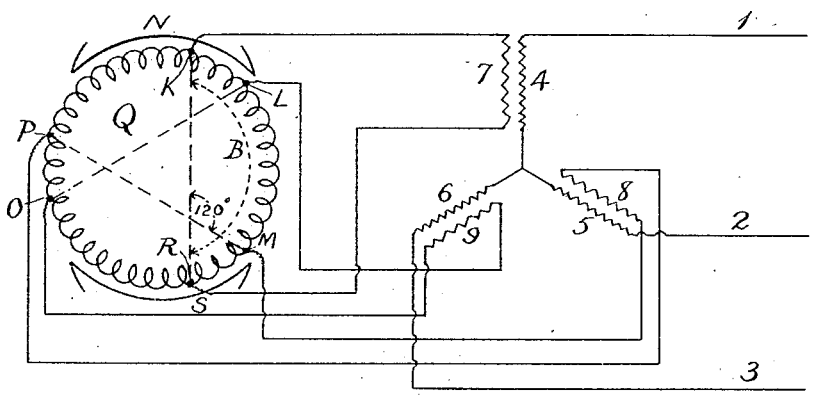

Figure 1, is a diagrammatic representation, illustrating the distribution of magnetic field around the armature of a synchronous machine, to which reference will be made in explaining the principles upon which my invention rests, while Fig. 2, shows the armature of a synchronous machine connected to an alternating current circuit in accordance with my invention.

In Fig. 1, the line A B represents the developed periphery of the armature of a synchronous bi-polar machine. The broken lines C D E F and G H I J represent the distribution of field flux around the armature, the ordinate $f$ at any point representing the flux density at that point. The point A which is fixed with reference to the field is taken as the origin and the angular distance from A to any other point around the periphery is represented by $\theta$.

We will consider the electro-motive-force developed in any section of the armature winding, as for example, that between the points X and Y, as it revolves in the field. Let $\beta$ represent the length of arc between the points X and Y, and let $\phi$ represent the angular distance between the origin A and the center point of the armature section X Y at any instant during the revolution.

In accordance with Fourier's well known theory, the relation between the values of $f$ and $\theta$ in Fig. 1, may be represented by the expression, (1.) $f = a_1 \sin. (\theta - \alpha_1) + a_3 \sin. 3(\theta - \alpha_3) + a_5 \sin. 5(\theta - \alpha_5) +$ etc.

The electro-motive-force developed in any elementary portion $d\theta$ of the armature winding at any instant will be proportional to the field strength and the magnitude of $d\theta$, and may therefore be represented by the expression $Kfd\theta$, in which K, is a constant depending on the design of the machine, the speed, and the units employed. The total electro-motive-force $v$ developed in the section X Y, at any instant corresponding to the angular distance $\phi$, will then be $$(2)\ v = \int_{\phi - \frac{\beta}{2}}^{\phi + \frac{\beta}{2}} Kfd\theta$$

Substituting in this the value of $f$, in equation (1) and integrating, we have $$v = K\left\{ a_1\left[\cos.\left(\phi - \frac{\beta}{2} - \alpha_1\right) - \cos.\left(\phi + \frac{\beta}{2} - \alpha_1\right)\right] + \frac{a_3}{3}\left[\cos. 3\left(\phi - \frac{\beta}{2} - \alpha_3\right) - \cos. 3\left(\phi + \frac{\beta}{2} - \alpha_3\right)\right] + \frac{a_5}{5}\left[\cos. 5\left(\phi - \frac{\beta}{2} - \alpha_5\right) - \cos. 5\left(\phi + \frac{\beta}{2} - \alpha_5\right)\right] + \text{etc.} \right\}$$

which may be reduced to $$v = 2K\left\{ a_1 \sin. \frac{\beta}{2} \sin. (\phi - \alpha_1) + \frac{a_3}{3} \sin. \frac{3\beta}{2} \sin. 3(\phi - \alpha_3) + \frac{a_5}{5} \sin. \frac{5\beta}{2} \sin. 5(\phi - \alpha_5) + \text{etc.} \right\}$$

It will be seen that this expression, which represents the wave shape of the alternating electro-motive-force developed between the points X and Y, consists of a fundamental sine wave, $$2K a_1 \sin. \frac{\beta}{2} \sin. (\phi - \alpha_1)$$

(the variable being the angle $\phi$), upon which is superposed various harmonics of the form $$2K \frac{a_n}{n} \sin. \frac{n\beta}{2} \sin. n(\phi - \alpha_n)$$

in which $n$, may be any odd integer. The higher harmonics in the series become negligible, both on account of the increasing value of $n$ in the denominator of the coefficient and also on account of the well known increase in the damping effect of any inductance in the circuit at higher frequencies. It is, however, desirable to suppress as far as possible the lower harmonics in any synchronous apparatus connected to an alternating current system. It is known that the third harmonic and its multiples may be suppressed in a three phase circuit by Y-connecting the primaries of the static transformers which are employed between said synchronous apparatus and the circuit. By examining the expression $$2K \frac{a_n}{n} \sin. \frac{n\beta}{2} \sin. n(\phi - \alpha_n)$$

it will be seen that this may be reduced to zero by selecting a suitable value for $\beta$, that is, a value such that $$\sin. \frac{n\beta}{2} = 0.$$

This will result if we make $$\frac{n\beta}{2} = \pi$$

or any integral multiple of $\pi$. Thus if it is desired to suppress the 5th harmonic, we may make $$\frac{5\beta}{2} = 2\pi,$$

from which $\beta = \frac{4\pi}{5}$. Or if it is desired to suppress the 7th harmonic, we may make $$\frac{7\beta}{2} = 3\pi,$$

from which $\beta = .857\pi$. Or, if $\beta$ be given an intermediate value, for example $.83\pi$, both the 5th and the 7th harmonics will be reduced to small values as compared with their maximum values. The maximum values of all the harmonics in the series will occur when $\beta = \pi$, corresponding to the diametrical connection of the armature. For if $$\beta = \pi, \sin. \frac{n\beta}{2} = +1 \text{ or} -1$$

for all odd integral values of $n$. If $$\beta = \frac{2\pi}{3},$$

corresponding to the usual three phase delta connection, the third harmonic and its multiples will disappear, since $$\sin. \frac{3\beta}{2} = 0,$$

but all of the other harmonics will bear the same proportion to the fundamental as they do with diametrical connection when $\beta = \pi$. For if $$\beta = \frac{2\pi}{3}, \sin. \frac{n\beta}{2} = \pm .866$$

for all odd integral values of $n$ except multiples of 3.

If, however, $\beta = .83\pi$, we have $$\sin. \frac{5\beta}{2} = .227$$

and $$\sin. \frac{7\beta}{2} = .294$$

That is, the 5th harmonic is reduced to 22.7% of its maximum value and the 7th to 29.4% of its maximum, the fundamental being only slightly reduced. The best value for $\beta$ between the limits $.8\pi$ and $.857\pi$ will depend upon the relative magnitude of the other factors in the coefficients of the two harmonics. Thus if $$\frac{a_5}{5}$$

is very small as compared with $$\frac{a_7}{7},$$

the 5th harmonic will be relatively small regardless of the value of $\beta$, and $\beta$ should be determined with reference to the 7th harmonic, its value being more nearly $.857\pi$. If on the other hand, $$\frac{a_7}{7}$$

is relatively small, $\beta$ should be determined with reference to the 5th harmonic, and its value should be more nearly $.8\pi$. The relative values of $a_5$ and $a_7$ will depend upon the distribution of the field flux, and may be determined when the locus of the lines C D E F and G H I J, in Fig. 1, is known.

In Fig. 2, are shown means for combining the two methods of suppressing harmonics above referred to, that is, the Y connection of the primaries of the static transformers designed to eliminate the third harmonic and its multiples in combination with suitable location of the alternating current taps to the armature winding, designed to reduce to a minimum the 5th or the 7th harmonic or both. In this diagram, Q is the armature of the bi-polar synchronous machine, N and S being respectively the north and south poles of the magnetic circuit. 1, 2, and 3, are the conductors of a three phase circuit to which are connected respectively the primary windings 4, 5, and 6, of three static transformers, the well known Y connection being shown. The secondary windings 7, 8, and 9, of these transformers are connected to the armature Q, in such a way that each includes an armature section whose angular span $\beta$ is made suitable to reduce to a minimum the 5th and 7th harmonics as explained above. The angular displacement between the three armature sections is 120° permitting these sections to be connected by means of the static transformers to the three phase circuit. The angle $\beta$ as here shown has an intermediate value between $.8\pi$ and $.857\pi$. It may, however, be made to approach or equal either of these limits according to whether it is desired to produce the greatest reduction in the 5th or 7th harmonics.

It will be understood that modifications may be made in the details without departing from the spirit of my invention, hence I do not limit the invention further than the prior state of the art may require, but

Having thus described the nature and objects of my invention, what I claim as new and desire to secure by Letters Patent is—

In combination, a three phase alternating current circuit, a synchronous dynamo electric machine having an armature and a winding uniformly distributed over its periphery, three pairs of taps from said armature winding, each pair including a span not less than 144 and not more than 154.3 electrical degrees, said spans successively displaced 120 electrical degrees around the periphery, static transformers having three independent secondary windings each connected to one of said pairs of taps and three primary windings Y-connected to the circuit.

In testimony whereof I have hereunto signed my name.

JOSEPH LESTER WOODBRIDGE.

Witnesses:
K. M. GILLIGAN,
FRANK E. FRENCH.